United States Patent [19]

Kuo et al.

[11] 3,876,560

[45] Apr. 8, 1975

[54] THICK FILM RESISTOR MATERIAL OF RUTHENIUM OR IRIDIUM, GOLD OR PLATINUM AND RHODIUM

[75] Inventors: Charles C. Y. Kuo, Bayside; Henry S. Angel, North Plainfield, both of N.J.

[73] Assignee: Engelhard Minerals and Chemicals Corporation, Murray Hill, N.J.

[22] Filed: June 22, 1973

[21] Appl. No.: 372,672

Related U.S. Application Data

[62] Division of Ser. No. 253,190, May 15, 1972, Pat. No. 3,769,382.

[52] U.S. Cl. .................. 252/514; 117/227; 338/308

[51] Int. Cl. .............................................. H01b 1/02

[58] Field of Search ...... 252/514; 338/308; 117/227

[56] References Cited

UNITED STATES PATENTS

| | | | |
|---|---|---|---|
| 2,789,187 | 4/1957 | Romer | 252/514 |
| 3,326,720 | 6/1967 | Bruhl, Jr. et al. | 117/227 |
| 3,479,216 | 11/1969 | Counts et al. | 252/514 |

*Primary Examiner*—T. H. Tubbesing
*Assistant Examiner*—Richard E. Berger
*Attorney, Agent, or Firm*—Morton, Bernard, Brown, Roberts & Sutherland

[57] ABSTRACT

A composition for use in thick film resistive elements having a low temperature coefficient of resistance is prepared by codepositing from an aqueous solution at least two precious metals one of which is ruthenium or iridium onto lead-containing glass frit, other metal components may also be deposited on the glass frit; prefiring the resulting glass frit at a temperature of at least about 600°C., and preferably below the melting point of the precious metals deposited thereon; and comminuting the prefired glass frit to a size suitable to be formulated in a resistor paste to prepare thick film resistives. A particularly advantageous glass frit for application in thick film resistives has deposited thereon ruthenium or iridium, gold or platinum, and rhodium. Preferably, the composition is essentially free of silver.

3 Claims, No Drawings

THICK FILM RESISTOR MATERIAL OF RUTHENIUM OR IRIDIUM, GOLD OR PLATINUM AND RHODIUM

This is a division, of application Ser. No. 253,190, filed May 15, 1972, now U.S. Pat. No. 3,769,382.

The present invention relates to thick film resistive elements and their manufacture, and particularly, to a precious metal-containing resistive composition which exhibits a low temperature coefficient of resistivity (TCR), relative freedom from high noise and drift, and a high moisture resistance. The properties of the resistive elements of the present invention are relatively insensitive to minor changes in process conditions during their manufacture, and separate elements exhibiting widely differing resistances can be made.

In accordance with the present invention, thick film resistives are prepared by codepositing from an aqueous solution one or both of ruthenium and iridium in elemental or combined form, and at least one other precious metal component on lead-containing glass frit. Other metal components may also be deposited on the glass frit. The resulting glass frit is then heated or prefired at a temperature of at least about 600°C., and preferably below the melting point of the precious metals deposited thereon. The prefired composite is comminuted to a size suitable to be formulated in a resistor paste to prepare thick film resistives. A particularly advantageous glass frit for application in thick film resistives has deposited thereon components comprised of ruthenium or iridium, gold or platinum, and rhodium.

As electronic circuitry becomes more complex and emphasis is placed on not only high performance, but also the miniaturization of such circuitry, new techniques for circuit fabrication and circuit design are required. Widespread adoption of printed circuits and hybrid integrated circuits has resulted to achieve miniaturization of electronic components. The development of thick film passive circuit elements is one factor which has enabled the manufacture of such microcircuits. The components for thick film elements which exhibit various electrical characteristics are in the form of fine powder which can be consolidated on a solid substrate by firing. The powder is usually applied to the substrate in a paste form using a graphic arts process, and the resulting film is often in the neighborhood of about 0.2 to 1.5 or more mils in thickness. Thick film resistive elements are normally formed from a mixture of finely divided ceramic powder such as glass, ceramics, and glazed (glass coated) ceramics and fine metal-containing particles. These resistive elements are commonly referred to as "cermet" resistive elements since they are derived from a combination of ceramic and metal materials. The formation of the thick film should desirably be reproducible in order that a thick film resistive element can be manufactured with a high degree of reliability and uniformity of electrical characteristics and without undue sensitivity to minor changes in the process conditions during their manufacture. Further, due to their employment in complex circuitry, the thick film resistive elements should exhibit a relative freedom from undue variation in electrical characteristics due to changes in environmental conditions such as temperature, pressure, and humidity. Thick film resistives should be free from rough surface characteristics, high noise characteristics; undue drift, and the like which impair beneficial employment in circuitry and should exhibit a high moisture resistance.

The resistance of thick film resistive elements, referred to as sheet resistance, is usually measured in "ohms per square", a parameter which considers only the amount of area taken up on a substrate by a given, uniformly thick film resistive to provide a given resistance. Values for resistance for thick film resistives are obtained by measuring the resistance between parallel sides of the film and dividing that value by the least number of geometric squares formed on the surface of the film having the width of the film as one side. Typically, a uniform film thickness of 1 mil is employed. Temperature coefficient of resistance (TCR), generally expressed in parts per million per degree Centigrade, is an important characteristic of resistors since changes in temperature can create relatively large changes in resistance. A value for TCR is generally obtained by measuring the resistance of a resistive element at various temperatures, and often the variation of resistance of a resistive element due to a change in temperature is non-linear in nature. If the TCR is too high, inevitable changes in ambient temperature in many modern applications of electronic circuits could lead to serious consequences. Thus, if a resistance element with a TCR of 1000 parts per million per degree Centigrade (ppm/°C.) were used in a circuit subjected to a 100°C. change in ambient temperature, the resistance thereof would change by a factor of 10 percent.

Various metal components have been employed in the prior art in conjunction with a ceramic base to make these resistive films. For instance, silver, gold, platinum, palladium, nickel, chromium, yttrium, lanthanum, thallium, indium, rhodium, titanium, tin, iridium, rhenium, zirconium, antimony, germanium, ruthenium, and aluminum in elemental or combined forms, such as their oxides, have been employed in thick film resistive compositions. Various metal alloys and combinations have also found application in thick film resistive elements such as nichrome, palladium-silver, palladium-gold, platinum-gold, ruthenium oxide-silver, ruthenium oxide-thallium oxide, multisubstituted oxides of bismuth and ruthenium, and the like. A particularly commonly used glass frit in the production of thick film resistors is borosilicate, and particularly, lead borosilicate.

There is provided by the present invention a method for the production of cermet compositions which are suitable for use as thick film resistive elements having low TCR values. Thick film resistives made in accordance with the present invention demonstrate, in addition to improved TCR, other desirable characteristics such as low noise, freedom from undue rough surfaces, improved moisture resistance, and low drift after extended use. The process of the present invention facilitates the production of thick film resistives having a high degree of reproducibility and uniformity with minimal sensitivity to changes in the process conditions employed. By the present invention, a resistor paste suitable for preparing thick film resistives can be prepared by codepositing from an aqueous solution one or both of ruthenium and iridium, and at least one other precious metal component on a finely-divided, lead-containing glass frit and incorporating the resulting glass firt into a resistor paste. The codeposited metal components are essentially water-insoluble. The precious or noble metals employed include gold, silver and the platinum group metals ruthenium, rhodium, palladium, osmium, iridium, and platinum. At least one of ruthenium and iridium is employed, especially in combination with one or both of gold and platinum and, in addition, rhodium also may be present. Other metal-containing components may be deposited on the glass frit in addition to the precious metals. The additional metals may be selected from the transition metals or from the metals in groups IA, IIA, IIIA, IVA and VA. A preferred method of depositing the precious metal components, and any other metal component, on the glass frit is by precipitating them from a soluble, inorganic salt solution of the metal in the presence of a reducing agent.

After deposition of the precious metal components on the glass frit, the frit is heated or prefired at a temperature of at least about 600°C., and preferably less than the melting point of the lowest melting precious metal present. Suitable temperatures may be in the range of about 600° to 1,000° or 1,200°C. After prefiring, the metal-containing glass frit is micronized or comminuted to a finely-divided size appropriate for incorporation in a resistor paste formulation. An advantageous lead-containing glass frit used in making compositions of this invention is lead borosilicate glass frit.

In a preferred operation, the ruthenium or iridium and other precious metal components are codeposited on the glass frit, and the resulting composite is prefired at a temperature in the range of about 600° to 1,000° or 1,200°C., preferably about 700° to 1,000°C., for a period of time at least sufficient to form lead ruthenate or lead iridate with the lead contained in the glass frit. When employing prefiring temperatures in excess of the softening point of the glass frit, which may be, for example, about 600° to 700°C., the glass frit tends to agglomerate. Thus, after prefiring, the glass frit is cooled and comminuted, usually after quenching, to provide an average particle size which is suitable for application in a resistor paste for producing thick film resistives. The resistives have highly advantageous properties, for instance, a thick film resistive containing ruthenium, rhodium, and gold has been found to provide a low TCR value and can be adapted to provide a range of elements of low or high resistivity. The higher resistances may be in excess of about 5,000 or 8,000 ohms per square, often in the range of about 20,000 to 1,000,000 or more ohms per square, and the products show little, if any change in electrical characteristics upon extended use.

The products of this invention are made by codepositing the ruthenium or iridium and other precious metal from an aqueous solution in which these metals are in dissolved form. This procedure is convenient and relatively inexpensive and avoids any need for making and using organo-metallic compounds and their attendant costs and disadvantages. The metal components may be deposited on the glass frit by employing a solution of the soluble, inorganic compounds of the metals, e.g. their salt forms. The solvent is conveniently predominantly water; hwoever, other polar solvents may be present in the solutions. The soluble, inorganic salts can advantageously be the chloride salts due to their common availability; however, other soluble, inorganic compounds of metals, such as the cyanides, bromides, nitrates, and the like, may be employed. It is realized that the selection of the inorganic salt of the metal and the solvent should be made so as to provide the desired dissolved metal. The deposition may be conducted by precipitating or reacting the metals from their dissolved state, and this, preferably, is done in the presence of a reducing agent, for instance, slightly alkaline formic acid. The codeposited metal components may be on the glass frit in combined form or in the elemental state, for instance in the case of gold. Other reducing agents which may be used are the formates, hydrosulfites, hydrazine hydrate and the like. It is realized that various reducing agents for the precipitation of the metal components can be employed, and care may be exercised in their selection to avoid undesirable competitive reactions which may include inter-reactions between metals, reactions of the metal with the reducing agent, and interreactions between the reducing agent employed and any other material which may be present in the deposition bath. Desirably, the precipitation is carried out at elevated temperatures, for instance, in the range of about 60° to 100°C., preferably about 80° to 90°C.

The coprecipitation of the plurality of precious metals on the glass frit by the use of a solution of the soluble, inorganic salts of the metals is particularly desirable since the metals can be simultaneously precipitated from the solution. As a result, the composition of the codeposited metals on the glass frit can be relatively uniform. Hence, a thick film resistive composed of glass frit having coprecipitated metal components thereon will exhibit uniform and predictable electrical characteristics. Further, such resistives possess a relatively low noise index. The process of manufacture of the coated glass frit will economically and efficiently employ the metal components, and the products will be relatively insensitive to changes in processing conditions. In coprecipitating the metals to form the metal components on the glass frit, care should be taken that the particular salts employed do not lead to the precipitation of an insoluble salt of only one of the precious metals, e.g., silver chloride in an aqueous medium. The preferred compositions of this invention are essentially free of silver.

The lead-containing glass frit employed as the substrate for the metal components is preferably of an average particle size of less than about 20 microns, and most preferably less than about 10 microns, e.g., in the range of about 0.5 to 10 microns. The glass frit should be essentially electrically non-conductive, should not absorb moisture, and should fuse to a smooth, glossy surface upon heating to a temperature above the melting point of the glass. The composition of the lead-containing glass frit may vary and may include, in addition to the oxides of silicon and lead, the oxides of one or more of aluminum, cadmium, strontium, boron, calcium, and the like. Lead borosilicate glass frit has been found to be particularly advantageous in the manufacture of thick film resistives due to its beneficial fusion temperature, coefficient of thermal expansion, fluidity, and the like. The glass frit contains substantial amounts of lead oxide and silica, either as oxides or in other combined forms such as lead silicate. The frit may contain about 10 to 90 weight percent of each of lead oxide and silica, often about 20 to 80 weight percent, based on their total. The lead oxide may comprise the major portion of the frit. Any other components in the glass are usually in minor amounts based on the total weight of the frit. A preferred glass frit for the production of resistor pastes comprises from about 50 to 75 percent by weight lead oxide, about 5 to 10 percent by weight boria, about 15 to 40 percent by weight silica and up to about 10 percent by weight other components such as alumina, cadmium oxide, opacifiers and other agents.

The particle size of the precipitated or deposited metal components on the glass frit is desirably less than about 30 microns in diameter, and preferably the average particle size is in the range of about 1–10 microns. The metal components on the glass frit are generally a minor amount and are effective to give desirable resistance characteristics to the thick film resistive, and often these metal components comprise about 1 to 50, preferably about 2 to 25, percent by weight based on the total weight of the compositions. Desirably, precious metal comprises a major portion of the metal components, and preferably at least about 90 percent of the metal components on a glass frit free basis. Advantageous metal components for thick film resistives have a major amount of ruthenium or iridium and a minor amount of other precious metal. For example, the metal components added to the frit may have about 50 to 95, preferably about 55 to 90, weight percent ruthenium or iridium, about 5 to 20 weight percent gold or platinum, and up to about 30, preferably at least about 5, say, about 15 to 25 weight percent rhodium, based on the total weight of the metal components.

Following deposition of the metallic component on the frit, the water can be drawn off by a convenient means. If desired, the water may be treated to recover any metal values contained therein. The resulting frit is usually washed to remove any undesirable, soluble ions. When deposition has been conducted by reducing a chloride salt of the metal to obtain the coprecipitated metal components on the frit, the washing can be continued until no precipitate is formed in the wash water when silver nitrate is added, thus indicating a relatively low concentration of chloride ion. The washed frit can be conveniently dried prior to prefiring.

The glass frit, containing the metal components can then be fired at a temperature in the range of about 600° to 1,000° or 1,200°C., preferably from about 700° to 1,000°C. Sintering of the glass frit is usually experienced during this firing or prefiring. The prefiring can be continued for a period from about 15 minutes to 12 or more hours, depending upon the prefiring temperature employed and depending, for instance, upon the completion of desired reactions between several of the components present such as a reaction between ruthenium or iridium with the oxides of lead, calcium or strontium to form the corresponding ruthenates or iridates. The prefiring of the metal-containing glass frit enables the production of a more stable thick film resistive, especially to the effects of temperature, moisture, and extended use. In the absence of prefiring, the resistive material may be unstable and, for instance, diffuse into an attached conductor during subsequent firing of the substrate. The prefiring is conveniently conducted in an air-containing atmosphere, although other oxygen-containing atmospheres may be employed. Preferably, the prefiring is conducted in an oxidizing atmosphere.

The glass frit containing the codeposited metals may be at least partially fused during prefiring. Often, the metal components deposited on the frit may serve to hinder complete fusion of the frit. It is desirable to grind the agglomerated frit, and then micronize or comminute it to the desired size for the production of a resistor paste for thick film resistives. Immediately quenching the agglomerated frit in cool or cold water will result in shattering of the frit to reduce the amount of grinding required to obtain the desired particle size. Preferably, the glass frit is comminuted to about its initial average size, i.e., preferably less than about 20 microns, most preferably less than about 10 microns. The comminuting of the frit may be accomplished by, for example, ball milling and the like. Methanol, ethanol, water and the like may be conveniently employed as the liquid phase material for ball milling. The comminuted, glass frit may be stored indefinitely without significant deterioration.

The comminuted glass frit containing the codeposited metal components can be prepared into a resistor paste for use in forming thick film resistives. The term resistor paste as used herein refers to pastes or more fluid slurry compositions. The glass frit containing the codeposited precious metals may be admixed with up to about 90, preferably about 5 or 10 to about 80, weight percent additional glass frit to adjust the metal component concentrations. The additional glass frit may be used as such or have a metal component thereon. Thus, for instance, by increasing the amount of added glass frit, the sheet resistance of a resulting thick film resistive is increased. A metal component of about 1 to 10 weight percent precious metal, preferably rhodium, on the additional glass frit has been found to improve the TCR of a thick film resistive prepared therefrom. The glass frit components can be incorporated into a paste by mixing or milling the glass frit with a liquid vehicle, which may include a thickener, e.g., ethyl cellulose or the like; a liquid carrier such as methanol, ethanol, acetone, methyl ethyl ketone, terpineol, pine oil, other organic solvents, water and the like; and, optionally, stabilizing agents and wetting agents. The resulting resistor paste may often have about 50 to 80 percent solids and about 20 to 50 percent vehicle. The viscosity of the resistive paste may affect the thickness of the thick film resistive and, hence, may affect the sheet resistance of the resistor thusly formed. The resistor paste may be applied to a suitable base or substrate by various convenient means such as brushing, spraying, stenciling, screening, printing and the like. Beneficially, the method of application of the resistive material provides a thick film coating of relatively uniform thickness. Typical solid substrate materials are electrically non-conductive, able to withstand the high temperatures used in firing the resistive to the substrate, have a smooth, fine textured surface characteristic, and are virtually impervious to moisture and other liquids. Often, the substrate is of a ceramic nature. Steatite, forsterite, sintered or fused aluminas, zircon porcelains, and the like, can be employed as substrates.

After the resistor paste is applied to the substrate, it is allowed to dry as by evaporating the carrier at a low heat. Warm air may be circulated over the applied resistor paste to assist in evaporation of the carrier. The vehicle employed in the resistor paste will generally contain sufficient binder that, when dried, the surface of the dried resistive paste is sufficiently strong in order that the substrate can withstand normal handling without marring or blemishing the dried resistive paste.

The resistive material can then be fired to fuse the frit into a continuous glassy phase in a conventional lehr or furnace by gradually increasing the temperature to a peak temperature of at least about the temperature at which the frit becomes molten but below the melting point of the metallic components, e.g., about 600° to 1,200°C., preferably about 600° to 1,000°C. The furnace is preferably held at the maximum peak temperature for at least about ten minutes to insure the production of a continuous glassy phase with a smooth surface. Excessive peak temperatures and fast heating rates may cause blisters or bubbles on the thick film resistive and may cause agglomeration of the metallic components. The temperature of the furnace can be slowly reduced after reaching and maintaining the desired peak temperature to insure that the thick film resistive is relatively free from spalling or undue stresses due to more rapid cooling which may effect the performance or properties of the resistive.

The following examples are presented to further illustrate the present invention but are not in limitation thereof. All parts and percentages referred to are by weight unless otherwise indicated. Examples I and II illustrate the codeposition of the metal components on the glass frit.

EXAMPLE I

A reducing solution is prepared by dissolving 480 parts of anhydrous potassium carbonate in about 5,000 parts distilled water. To this solution is added slowly a solution of 161 parts formic acid in about 1,000 parts distilled water. A metal-containing solution is prepared as follows. Ruthenium in the form of ruthenium chloride in the amount of 181 parts is added to about 3,500 parts distilled water. The metal-containing solution is stirred until the ruthenium chloride is dissolved. A sufficient amount of standardized liquor of gold ($HAuCl_4$ in water to provide a solution of 35 percent gold) is added to the metal-containing solution to provide 19 parts of gold. The reducing solution is heated to about 85° to 87°C. and thereat maintained. To the reducing solution is added 1,800 parts of glass frit having an average particle size of less than about 20 microns and a composition as follows:

| Component | Weight Percent |
|---|---|
| PbO | 62.2 |
| $B_2O_3$ | 8.5 |
| $SiO_2$ | 21.4 |
| $Al_2O_3$ | 3.0 |
| CdO | 4.9 |

This glass frit is hereinafter referred to as Drakenfeld E-1410 glass frit. The metal-containing solution is then added to the reducing solution at a rate of about 50 parts per minute under continuous stirring. The stirring is continued for 1 hour after completing the addition of the metal-containing solution with the temperature of the solution being maintained at about 85° to 90°C. During the subsequent stirring, about 2,000 parts distilled water are slowly added to maintain liquid volume. The solution is then allowed to settle and the clear, colorless aqueous layer is drawn off. The resulting glass frit is washed with hot distilled water until silver nitrate does not precipitate in the wash liquor. The washed glass frit is filtered and dried to a constant weight. Analysis shows the glass frit to comprise by weight 9.05 percent ruthenium, 0.95 percent gold, and 90 percent glass frit. The glass frit can be fired, comminuted and employed in a paste for making thick film resistives.

EXAMPLE II

A reducing solution is prepared by dissolving 765 parts of anhydrous potassium carbonate in about 5,000 parts distilled water. To this solution is added slowly a solution of 259.8 parts formic acid in 1,750 parts distilled water. A metal-containing solution is prepared as follows. Ruthenium in the form of ruthenium chloride in the amount of 229.5 parts is added to about 5,000 parts of distilled water. The metal-containing solution is stirred until the ruthenium chloride is dissolved. Gold, as the standardized liquor, is then added to the metal-containing solution in the amount of 24.0 parts, and rhodium, as rhodium chloride, is also added to the metal-containing solution in the amount of 63.0 parts. To the reducing solution is added 1,183.5 parts of Drakenfeld E-1410 glass frit. The reducing solution is heated to about 85° to 87°C. and maintained thereat. The metal-containing solution is slowly added to the heated reducing solution at a rate of about 70 parts per minute under continuous stirring. After completion of the addition of the metal-containing solution, the solution is stirred for one hour at 85°C. to complete the precipitation reaction, then the solution is raised to 90°C. for ½ hour. The solution is allowed to settle and the clear, colorless aqueous layer which forms is drawn off. The resulting glass frit is washed with hot distilled water until no precipitate is formed when silver nitrate is added to the wash water. The washed glass frit is filtered and dried to a constant weight. Analysis shows the glass frit to comprise by weight 15.3 percent ruthenium, 1.6 percent gold, 4.2 percent rhodium, and 78.9 percent frit. The glass frit can be fired, comminuted and employed in a paste for making thick film resistors.

In the following examples, essentially the same technique as employed in Examples I and II is utilized to codeposit the metal components on the frit. The resistor paste is prepared in essentially the same manner in each of the following examples. The vehicle for the resistor paste is made by adding 6 weight percent ethyl cellulose to 94 weight percent 2,2,4-trimethyl-1,3-pentane diol, commercially available under the trademark TEXANOL from Eastman Chemical Products, Inc., and heating the mixture at about 100°C. until the solution becomes homogeneous. The precious metal-containing glass frit and other glass frit, if desired, are mixed with the vehicle, and the mixture is roll milled. The resultant paste is screened through a 200 or 300 mesh stainless steel screen (U.S. Standard Sieve Series) on to a 96 weight percent alumina substrate. The printed resistive is dried at 60° to 100°C. and can then be fired. The thickness of the thick film resistors thus prepared is about 0.6 mil. The sheet resistance is measured by 1/2, 1, 2 and 10 squares resistor patterns. All of the TCR's reported were determined between 25°C. and 125°C.

EXAMPLE III

A coprecipitated precious metal component on Drakenfeld E-1410 glass frit is prepared and is analyzed as containing 2.7 percent ruthenium, 0.3 percent gold, and 97 percent glass frit. The glass frit is prefired at 850°C., incorporated into a resistor paste and applied to the substrate in the usual manner. Substrates having the resistive film thereon are subjected to various peak firing temperatures. As a comparison, the above procedure is followed except that the precious metal-containing glass frit, while unsupported on the substrate, is not fired or is fired at 450°C. The results are presented in Table I.

TABLE I

| Prefire Temperature, °C. | Prefire Time, Hr. | PEAK FIRING TEMPERATURE 600°C. Resistivity Ohms/sq. | 600°C. TCR ppm/°C. | 750°C. Resistivity Ohms/sq. | 750°C. TCR ppm/°C. | 850°C. Resistivity Ohms/sq. | 850°C. TCR ppm/°C. |
|---|---|---|---|---|---|---|---|
| 850 | ½ | 4.5k | +370 | 5k | +210 | 7k | +190 |
| Unfired | — | 23k | −380 | 10k | +240 | 5k | +440 |
| 450 | ½ | 58k | −420 | 11k | +350 | 6k | +630 |

This example illustrates the improved TCR of thick film resistives prepared by the process of this invention and high sensitivity of thick film resistives prepared from non-prefired or low temperature prefired precious metal-containing glass frit while unsupported on the substrate to the peak firing temperature to which the resistive film on the substrate is subjected as compared to the sensitivity of a thick film resistive element made in accordance with the present invention.

EXAMPLE IV

A coprecipitated metal-containing glass frit is prepared, and the glass frit is analyzed to contain 9.05 percent ruthenium, 0.95 percent gold, and 90 percent Drakenfeld E-1410 glass frit. The precious metal-containing glass frit is prefired at 850°C. for 5 hours and subsequently incorporated in to a resistor paste in the usual manner. After application of the resistor paste upon a substrate, the paste is fired at a peak temperature of 750°C. The results are presented in Table II.

TABLE II

| Amount Additional Frit, % | Sheet Resistance Ohms/sq. | TCR ppm/°C. |
|---|---|---|
| 0 | 560 | +450 |
| 15 | 1.5K | +300 |
| 28 | 4.9K | +120 |
| 28 (roll milled) | 5.2K | + 20 |

This example illustrates the ability of the precious metal-containing glass frit to be combined with additional glass frit to obtain an advantageous TCR.

EXAMPLE V

In this example, a coprecipitated precious metal-containing glass frit is prepared and is analyzed to contain 15 percent ruthenium, 4.5 percent rhodium, 1.5 percent gold, and 79 percent Drakenfeld E-1410 glass frit. The glass frit is prefired at various temperatures for various periods of time prior to incorporation into a resistor paste. For comparison, a portion of the glass frit is prefired at 450°C. After the resistor paste is applied to the substrate, it is fired at either 750°C. or 850°C. The results are presented in Table III.

TABLE III

| Prefire Temperature | Prefire Time, Hrs. | Amount Additional Frit, % | PEAK FIRING TEMPERATURE 750°C. Sheet Resistivity Ohms/sq. | 750°C. TCR ppm/°C. | 850°C. Sheet Resistance Ohms/sq. | 850°C. TCR ppm/°C. |
|---|---|---|---|---|---|---|
| 450°C. | 7 | 0 | 220 | −250 | 360 | −410 |
| 800°C. | ½ | 0 | 45 | +280 | 75 | +220 |
| 800°C. | ½ | 23 | 200 | +100 | 250 | + 92 |
| 900°C. | ½ | 0 | 300 | +200 | 470 | +120 |
| 850°C. | 8½ | 0 | 135 | +240 | 200 | +190 |
| 900°C. | 9 | 0 | 160 | +230 | 210 | +175 |
| 900°C. | 9 | 14 | 950 | + 55 | 1.6K | − 30 |

The foregoing example illustrates the high thermal stability of thick film resistives prepared in accordance with the present invention.

EXAMPLE VI

A coprecipitated precious metal-containing glass frit is prepared and is analyzed to contain 15 percent ruthenium, 4.5 percent rhodium, 1.5 percent gold, and 79 percent Drakenfeld E-1527 glass frit. The composition of Drakenfeld E-1527 glass frit is as follows:

| Compound | % Amount |
|---|---|
| PbO | 51 |
| $SiO_2$ | 30 |
| $B_2O_3$ | 9 |
| $Al_2O_3$ | 3 |
| CdO | 3.1 |
| ZrO | 0.7 |
| $Na_2O$ | 1.4 |
| $TiO_2$ | 2.1 |

The glass frit is prefired at 850°C. for 2 hours prior to being incorporated in a resistor paste. After application on a substrate and being fired at a peak firing temperature of 750°C., the thick film resistive exhibited a sheet resistance of 450 ohms/sq. and a TCR of −30 ppm/°C. When fired at a peak firing temperature of 850°C., the thick film resistive demonstrated a sheet resistance of 550 ohms/sq. and a TCR of −170 ppm/°C. Another portion of the precious metal-containing glass frit is unfired prior to being incorporated into the resistor paste and is used as a control. When applied to a substrate, exhibits a sheet resistance of 4K ohms/sq. and a TCR of −2,100 ppm/°C. when fired at a peak firing temperature of 750°C., and a sheet resistance of 6.5K ohms/sq. and a TCR of −1,900 ppm/°C. when fired at a peak firing temperature of 850°C. This example clearly demonstrates the low TCR of a thick film resistive prepared in accordance with the present invention utilizing another lead-containing glass frit, and the significant improvement in TCR achievable by prefiring the precious metal-containing glass frit over a control which is not prefired.

EXAMPLE VII

A coprecipitated precious metals-containing glass frit is prepared comprising 30.8 percent ruthenium, 7.7 percent gold, 11.5 percent rhodium, and 50 percent Drakenfeld E-1410 glass frit. The glass frit is prefired at 850°C. for three hours and subsequently incorporated into a resistor paste. Various thick film resistors are prepared employing the precious metals-containing glass frit, the precious metals-containing glass frit with additional frit, and additional frit having deposited thereon various amounts of rhodium. The results of this example are presented in Table IV.

TABLE IV

| Additional Glass Frit, % | Rhodium on Additional Frit, % | PEAK FIRING TEMPERATURE 750°C. Resistivity Ohms/sq. | 750°C. TCR ppm/°C. | 850°C. Resistance Ohms/sq. | 850°C. TCR ppm/°C. |
|---|---|---|---|---|---|
| 0 | 0 | 7.5 | +400 | 5.8 | +400 |
| 15 | 0 | 20 | +230 | 2.0 | +230 |
| 15 | 2.4 | 21 | +180 | 2.3 | +180 |
| 15 | 4.8 | 21 | +130 | +20 | +100 |

EXAMPLE VIII

A coprecipitated, precious metals-containing glass frit is prepared containing 15 percent iridium, 4 percent rhodium, 2 percent gold, and 79 percent Drankenfeld E-1410 glass frit. The precious metals-containing glass frit is prefired at 850°C. for five hours and subsequently incorporated in a resistor paste. The resistor paste is applied on a substrate and fired at various peak firing temperatures. At a peak firing temperature of 600°C., the thick film resistor exhibited a sheet resistance of 1.3K ohms/sq. and a TCR of +65 ppm/°C.; at 750°C. a sheet resistance of 1.4K ohms/sq. and a TCR of +40 ppm/°C. is obtained; and at 850°C. the sheet resistance is 2.4K ohms/sq. and the TCR is −50 ppm/°C.

EXAMPLE IX

A coprecipitated precious metals-containing glass frit is prepared containing 9.05 percent ruthenium, 0.95 percent gold, and 90 percent Corning 0112 leadless frit. The precious metals-containing glass frit is prefired at 900°C. for 1½ hours and is subsequently incorporated in a resistor paste. The resistor paste is then applied to a substrate and subjected to a peak firing temperature of either 750°C. or 850°C. At 750°C., the thick film resistive exhibits a sheet resistance of 140K ohms/sq. and a TCR of −150 ppm/°C., and at 850°C., 1.5K ohms/sq. and +600 ppm/°C. This example illustrates a high sensitivity of a thick film resistive prepared in the same manner as the present invention, but utilizing a leadless glass frit to the peak firing temperature as compared to a thick film resistive of Example V.

EXAMPLE X

A coprecipitated precious metals-containing glass frit is prepared containing 9.05 percent ruthenium, 0.95 percent gold, and 90 percent Pemco leadless frit. The precious metals-containing glass frit is prefired at 850°C. for 2 hours prior and is subsequently incorporated in a resistor paste. A resistor paste employing the fired glass frit does not adhere well to an alumina substrate when it is subjected to a peak firing temperature in the range of about 750°C. to 900°. Thus, the sheet resistance and TCR observed in this example are unreliable. The sheet resistance is in the range from about 240 to 500 ohms/sq., and the TCR is about from +240 to −100 ppm/°C. for peak firing temperatures from about 600°C. to 850°C. The results of this example are inconclusive.

EXAMPLE XI

A coprecipitated precious metals-containing glass frit is prepared containing 4.55 percent ruthenium, 0.45 percent gold, and 95 percent Pemco leadless glass frit. The precious metals-containing frit is prefired at 850°C. for three hours prior and is subsequently incorporated into a resistor paste. The resistor paste is then applied to the substrate and subjected to peak firing temperatures from about 600°C. to 800°C. No resistance readings are obtained, since the resistance values are too excessive to be measured. This example further demonstrates the unreliability of the results of Example X, and hence, unsuitability of leadless frit for the preparation of thick film resistives.

It is claimed:

1. A finely-divided ceramic material having precious metal components and suitable for use in resistor pastes for making thick film resistors comprising lead-containing glass frit having codeposited thereon an effective amount to provide said resistor, of precious metal components consisting essentially of about 50 to 95 percent ruthenium or iridium, about 5 to 20 percent gold or platinum, and about 5 to 30 percent rhodium.

2. The finely-divided ceramic material of claim 1 wherein the precious metal components contain ruthenium.

3. The finely-divided ceramic material of claim 2 wherein the rhodium is about 15 to 25 percent of the precious metal components.

* * * * *